United States Patent
Meyer et al.

(10) Patent No.: US 11,157,491 B2
(45) Date of Patent: Oct. 26, 2021

(54) COMPILATION FRAMEWORK FOR DYNAMIC INLINING

(71) Applicant: SAP SE, Walldorf (DE)

(72) Inventors: Nicolas Meyer, Saint Laurent du Var (FR); Yann Colina, Asnieres sur Seine (FR); Maik Goergens, Nussloch (DE); Arnaud Lacurie, Wiesloch (DE); Srdan Stipic, Leimen (DE)

(73) Assignee: SAP SE, Walldorf (DE)

( * ) Notice: Subject to any disclaimer, the term of this patent is extended or adjusted under 35 U.S.C. 154(b) by 184 days.

(21) Appl. No.: 16/164,682

(22) Filed: Oct. 18, 2018

(65) Prior Publication Data
US 2020/0125561 A1    Apr. 23, 2020

(51) Int. Cl.
*G06F 16/242* (2019.01)
*G06F 8/41* (2018.01)

(52) U.S. Cl.
CPC ............ *G06F 16/2445* (2019.01); *G06F 8/41* (2013.01); *G06F 16/2438* (2019.01)

(58) Field of Classification Search
CPC ..... G06F 16/2438; G06F 16/2445; G06F 8/41
See application file for complete search history.

(56) References Cited

U.S. PATENT DOCUMENTS

| | | | |
|---|---|---|---|
| 7,360,207 B2* | 4/2008 | Fahs | G06F 11/3466 714/E11.2 |
| 7,913,224 B2* | 3/2011 | Nissen | G06F 8/34 717/106 |
| 8,352,459 B2* | 1/2013 | Pennell, Sr. | G06F 16/24542 707/713 |
| 8,601,016 B2* | 12/2013 | Briggs | G06F 16/242 707/760 |
| 9,195,712 B2* | 11/2015 | Freedman | G06F 16/24542 |
| 2005/0027701 A1* | 2/2005 | Zane | G06F 16/2456 |
| 2005/0188362 A1* | 8/2005 | Metzger | G06F 8/54 717/151 |
| 2012/0151448 A1* | 6/2012 | Becker | G06Q 10/06 717/125 |
| 2012/0166422 A1* | 6/2012 | Harren | G06F 16/24542 707/718 |
| 2012/0226693 A1* | 9/2012 | Zhang | G06F 16/24537 707/737 |
| 2017/0060948 A1* | 3/2017 | Ma | G06F 16/2246 |

\* cited by examiner

*Primary Examiner* — Miranda Le
(74) *Attorney, Agent, or Firm* — Fountainhead Law Group P.C.

(57) ABSTRACT

Disclosed embodiments include generating code from a database query and providing a framework to develop complex data structures and the functions that access those data structures outside of the generated code to access the complex data structures. These data structure functions can be precompiled in order to save compilation time at query runtime, and linked to the generated code in a way that the framework can still inline function calls and apply various optimizations on the linked code.

8 Claims, 9 Drawing Sheets

```
linked code, 122a define i32 @main( ) {
  %1 = alloca i32, align 4
  store i32 0, i32* %1, align 4
  %2 = call i32 @add( i32 1, i32 2 )
  ret i32 %2
} declare i32 @add  ( i32, i32 )

define i32 @add( i32 %a, i32 %b ) {
  %1 = alloca i32, align 4
  %2 = alloca i32, align 4
  store i32 %a, i32* %1, align 4
  store i32 %b, i32* %2, align 4
  %3 = load i32, i32* %1, align 4
  %4 = load i32, i32* %2, align 4
  %5 = add nsw i32 %3, %4
  ret i32 %5
}
``` optimize →

```
optimized code, 124a define i32 @main( ) {
  %1 = alloca i32, align 4
  %1 = alloca i32, align 4
  %2 = alloca i32, align 4
  store i32 1, i32* %1, align 4
  store i32 2, i32* %2, align 4
  %3 = load i32, i32* %1, align 4
  %4 = load i32, i32* %2, align 4
  %5 = add nsw i32 %3, %4
  ret i32 %5
}
```

FIG. 7

```
run:
        pushq   %r14
        movq    %rdi, %r14
        pushq   %r13
        movq    %rdx, %r13
        pushq   %r12
        movq    %rsi, %r12
        pushq   %rbp
        xorl    %ebp, %ebp
        pushq   %rbx
        xorl    %ebx, %ebx
.L3:
        movl    (%r12,%rbx), %esi
        movl    (%r14,%rbx), %edi
        call    plus
        cmpl    $2, %eax
        setg    %al
        addq    $4, %rbx
        movzbl  %al, %eax
        addl    %eax, %ebp
        cmpq    $512, %rbx
        jne     .L3
        popq    %rbx
        movl    %ebp, 0(%r13)
        popq    %rbp
        popq    %r12
        popq    %r13
        popq    %r14
        ret
``` machine executable code, 126a

COMPILATION FRAMEWORK FOR DYNAMIC INLINING

BACKGROUND

In a query language like SQL, a database client enables generation of queries that say what to do with a database, but not how to do it. It is the task of a database management system (DBMS) to translate the clients declarative specification (query) into an operational procedure. When a user specifies a database query like:

select LastName, FirstName from EmpTable where DEPT=engineering, the DBMS parses and analyzes the query to form a high-level execution plan. This plan might consist of several steps, such as:

scan the set of records in the EmpTable data table
    limit the set to records whose DEPT column value is 'engineering'
    extract/project the LastName and FirstName columns from the resulting records
    return a set of tuples comprising <LastName, FirstName>

Some DBMS's use code generation to speed up the execution of SQL queries to reduce the time it takes to produce a result for the database query. For example, a DBMS can process an SQL query to generate program code expressed in a suitable procedural programming language (e.g., C programming language) that is highly targeted and optimized for the specific query. The generated C code is then compiled using a C compiler and the resulting executable file (e.g., a.out) is executed to produce query results.

A database can include complex data structures that the generated code may have to interact with in order to produce query results in accordance with the received database query. The data structures may be auxiliary structures in addition to the database tables that define the DBMS to facilitate certain functions. For example, index tables may be generated to facilitate searches), specialized hash tables may be created to optimize JOIN operations, and so on; these tables may be optimized for the kind of data that is stored in the DBMS, optimized for the kinds of access to the data, etc. Adding code in order to access/manipulate such data tables can significantly increase the compile time of the generated code, thus defeating or otherwise mitigating any benefits gained by the use of the generated code to begin with.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
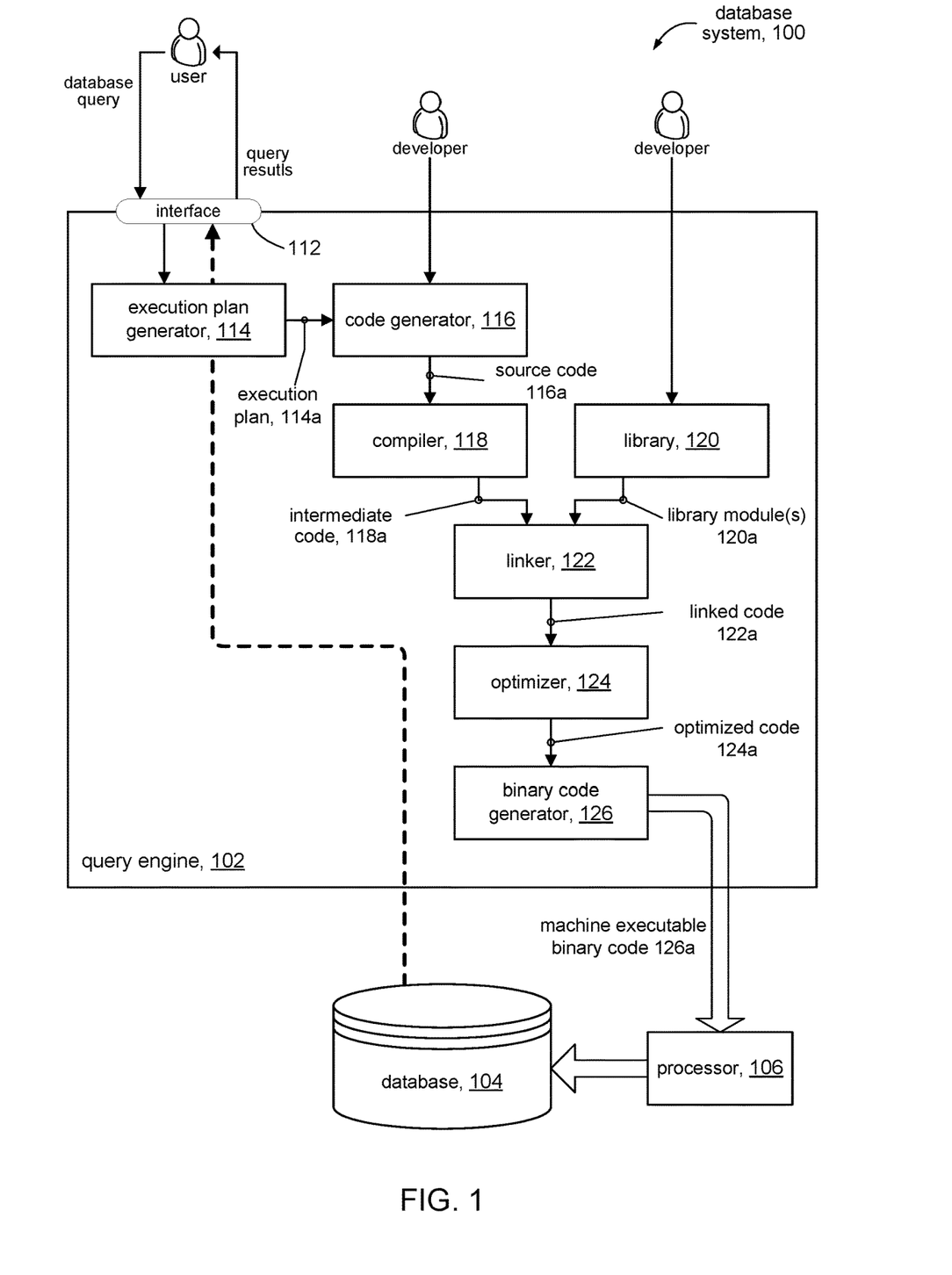
FIG. 1 shows a high level diagram of a database system in accordance with some embodiments.

FIG. 1 shows a database system 100 in accordance with embodiments of the present disclosure. The database system 100 can include a query engine 102 to process database queries made on the database 104. For the purpose of this description, the discussion will assume, without loss of generality, the database system 100 to be a relational database management system (RDMS). It is noted, however, that persons of ordinary skill will understand the present disclosure can be practiced in a non-relational database system.

The query engine 102 can include an interface 112 to receive database queries from a user, and to provide query results back to the user. The interface 112 can provide a received database query to an execution plan generator 114 to generate an execution plan 114a that specifies a series of operations on the database 104 to execute the received database query. A code generator 116 can generate source code 116a based on the execution plan 114a.

The query engine 102 can include a compiler 118 to compile the generated source code 116a to produce intermediate code 118a. In accordance with the present disclosure, the intermediate code 118a is expressed in an intermediate representation that is not a machine level programming language. In other words, the intermediate representation cannot be executed by the central processing unit (CPU) in a computer. As the name suggests, the intermediate representation is an intermediate form that can represent source code written in different programming languages (e.g., C, C++, etc.) using a common language. This aspect of the present disclosure is discussed further below.

The query engine 102 can include a linker 122 to resolve function calls (invoked functions) that are made in the source code 116a (and in the corresponding intermediate code 118a) that are not defined in the source code 116a. For example, the malloc( ) function is a system function that allocates memory, and is not a function that would be defined in the source code 116a. Likewise, application-level functions, rather than system-defined functions, can be invoked in the source code 116a but otherwise are not defined in the source code 116a. Such functions can be provided in one or more library modules 120a stored in a library 120. The linker 122 can link function calls made in the intermediate code 118a to the actual functions in the library modules 120a. In accordance with the present disclosure, functions in the library modules 120a comprise statements expressed in the same intermediate representation as the intermediate code 118a. The linker 122 produces linked code 122a that comprises statements in the intermediate representation. These aspects of the present disclosure are discussed in further detail below.

The query engine 102 can include an optimizer 124 to make transformations on the linked code 122a to produce optimized (transformed) code 124a. The optimized code 124a can then be translated or otherwise processed by a binary code generator 126 to produce machine executable code 126a. The machine executable code 126a comprises a sequence of 1's and 0's (binary code) that can be executed by a processor 106. The machine executable code 126a can cause the processor 106 to perform operations on the database 104 to produce query results in accordance with the received database query. The query results can be provided to the user via interface 112. The processor 106 can be part of the processing unit in the query engine 102 in some embodiments, and in other embodiments can be separated from the query engine 102.

Figure 2:
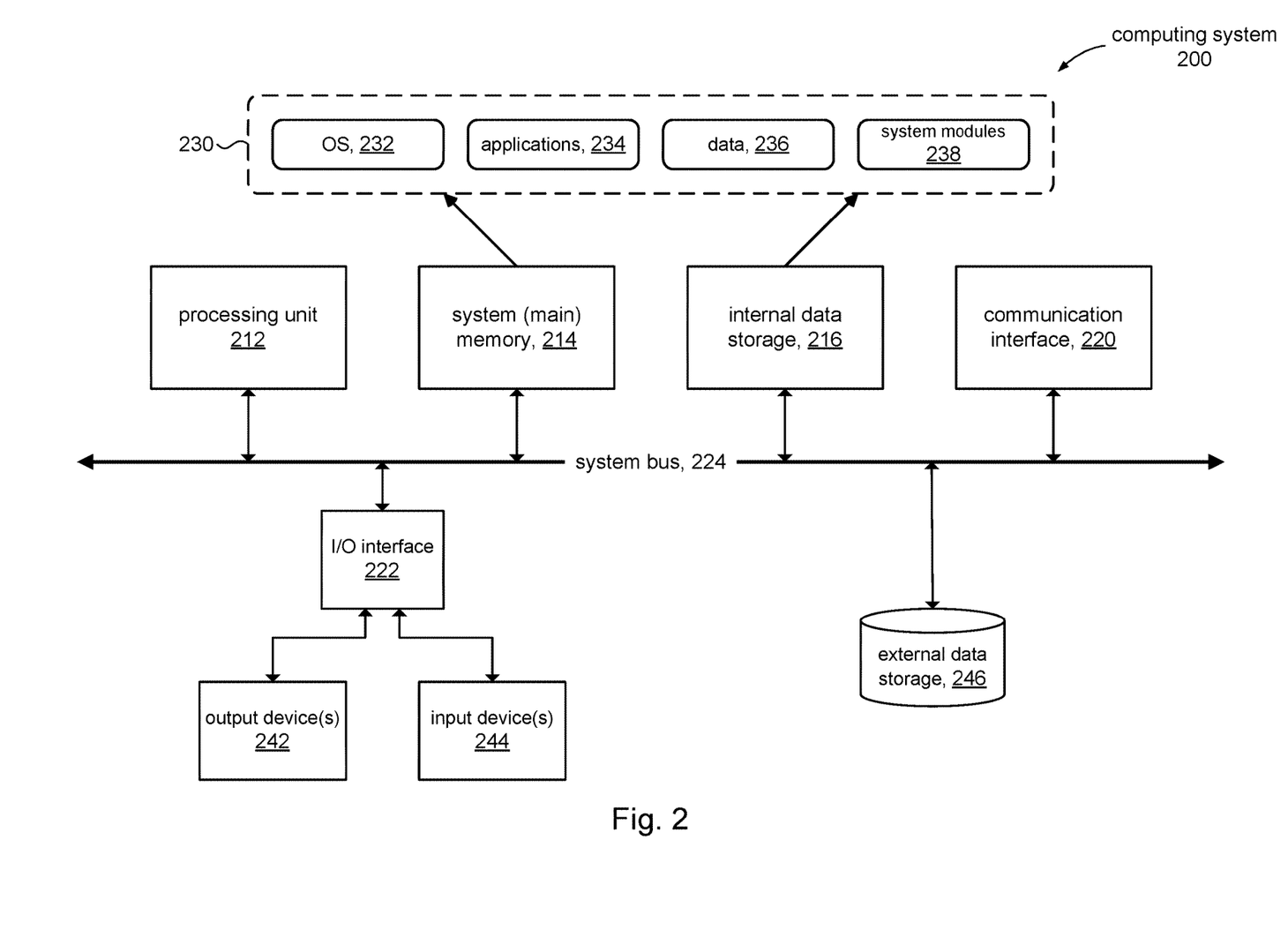
FIG. 2 shows a illustrative computer system in accordance with the present disclosure.

FIG. 2 is a simplified block diagram of an illustrative computing system 200 for implementing one or more of the embodiments described herein (e.g., query engine 102, FIG. 1). The computing system 200 can perform and/or be a means for performing, either alone or in combination with other elements, operations in accordance with the present disclosure. Computing system 200 can also perform and/or be a means for performing any other steps, methods, or processes described herein.

Computing system 200 can include any single- or multi-processor computing device or system capable of executing computer-readable instructions. In a basic configuration, computing system 200 can include at least one processing unit 212 and a system (main) memory 214.

Processing unit 212 can comprise any type or form of processing unit capable of processing data or interpreting and executing instructions. The processing unit 212 can be a single processor configuration in some embodiments, and in other embodiments can be a multi-processor architecture comprising one or more computer processors. In some embodiments, processing unit 212 can receive instructions from program and data modules 230. These instructions can cause processing unit 212 to perform operations in accordance with the various disclosed embodiments (e.g., FIG. 3) of the present disclosure.

System memory 214 (sometimes referred to as main memory) can be any type or form of storage device or storage medium capable of storing data and/or other computer-readable instructions, and comprises volatile memory and/or non-volatile memory. Examples of system memory 214 include any suitable byte-addressable memory, for example, random access memory (RAM), read only memory (ROM), flash memory, or any other similar memory architecture. Although not required, in some embodiments computing system 200 can include both a volatile memory unit (e.g., system memory 214) and a non-volatile storage device (e.g., data storage 216, 246).

In some embodiments, computing system 200 can include one or more components or elements in addition to processing unit 212 and system memory 214. For example, as illustrated in FIG. 2, computing system 200 can include internal data storage 216, a communication interface 220, and an I/O interface 222 interconnected via a system bus 224. System bus 224 can include any type or form of infrastructure capable of facilitating communication between one or more components comprising computing system 200. Examples of system bus 224 include, for example, a communication bus (such as an ISA, PCI, PCIe, or similar bus) and a network.

Internal data storage 216 can comprise non-transitory computer-readable storage media to provide nonvolatile storage of data, data structures, computer-executable instructions, and so forth to operate computing system 200 in accordance with the present disclosure. For instance, the internal data storage 216 can store various program and data modules 230, including for example, operating system 232, one or more application programs 234, program data 236, and other program/system modules 238 to implement structures to support and perform various processing and operations disclosed herein.

Communication interface 220 can include any type or form of communication device or adapter capable of facilitating communication between computing system 200 and users of the query engine 102.

Computing system 200 can also include a local output device 242 (e.g., a display) coupled to system bus 224 via I/O interface 222, for example, to provide access to an administrator. The output device 242 can include any type or form of device capable of visual and/or audio presentation of information received from I/O interface 222.

Computing system 200 can also include a local input device 244 coupled to system bus 224 via I/O interface 222, e.g., for administrator access. Input device 244 can include any type or form of input device capable of providing input, either computer or human generated, to computing system 200. Examples of input device 244 include, for example, a keyboard, a pointing device, a speech recognition device, or any other input device.

Computing system 200 can also include external data storage subsystem 246 coupled to system bus 224. In some embodiments, the external data storage 246 can be accessed via communication interface 220. External data storage 246 can be a storage subsystem comprising a storage area network (SAN), network attached storage (NAS), virtual SAN (VSAN), and the like. External data storage 246 can comprise any type or form of block storage device or medium capable of storing data and/or other computer-readable instructions. For example, external data storage 246 can be a magnetic disk drive (e.g., a so-called hard drive), a solid state drive, a floppy disk drive, a magnetic tape drive, an optical disk drive, a flash drive, or the like. In some embodiments, database 104 in FIG. 1 can comprise external data storage subsystem 246.

Figure 3:
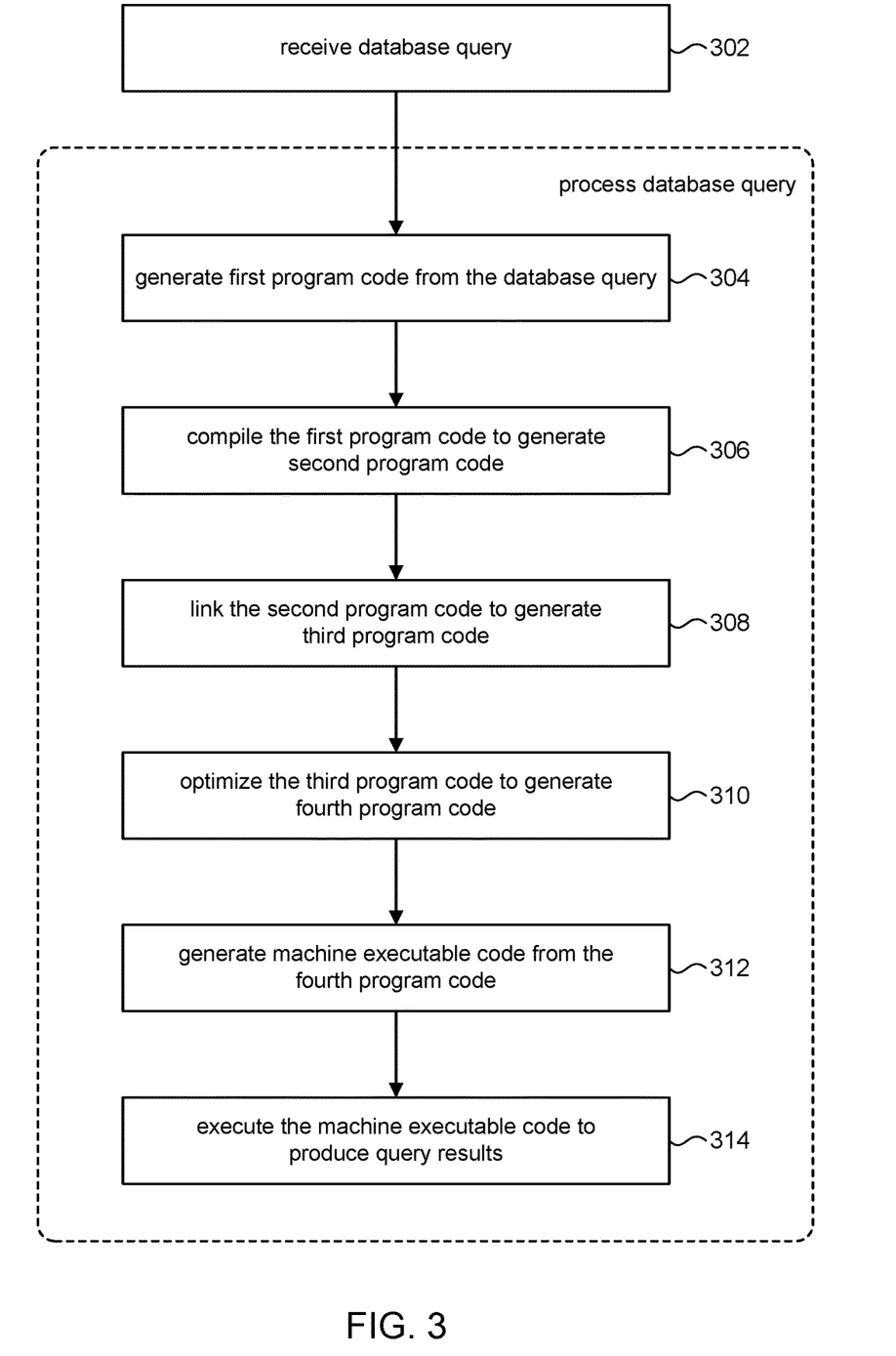
FIG. 3 shows operations for processing a database query in accordance with the present disclosure.

Referring to FIG. 3 and with reference to other figures, the discussion will now turn to a high level description of processing in the query engine 102 (FIG. 1) for processing a database query from a user to produce query results in accordance with the present disclosure. In some embodiments, for example, the logical block manager 102 may include computer executable program code, which when executed by a computer system (e.g., 202, FIG. 2), may cause the computer system to perform the processing in accordance with FIG. 3. The flow of operations performed by the computer system is not necessarily limited to the order of operations shown.

At operation 302, the query engine 102 can receive a database query from a user, for example via interface 112, to access data in the database 104. The database query can be expressed as a sequential query language (SQL) statement.

At operation 304, the query engine 102 can begin processing the database query. In some embodiments, the query engine 102 can generate first program code (e.g., source code 116a) from the received database query, for example, using code generator 116. In some embodiments, the query engine 102 can generate a query execution plan that represents an ordered set of steps to access various data tables in the database 104 and to process the accessed data to produce query results according to the database query. Source code 116a can be generated from the resulting execution plan.

Figure 4:
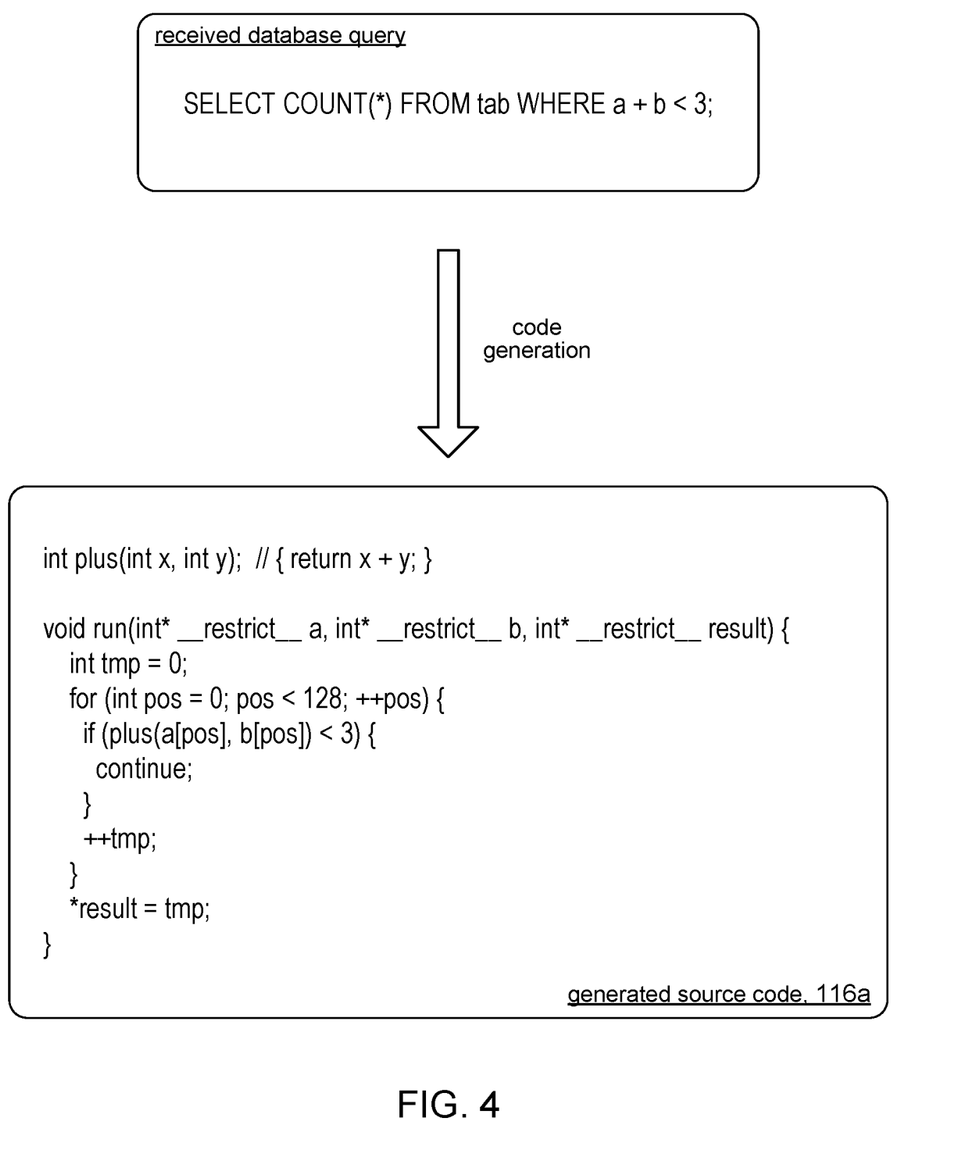
FIG. 4 illustrates an example of source code that can be generated from a database query.

In some embodiments, the source code 116a be expressed in a procedural programming language such as the C Programming language, for example; although persons of ordinary skill will appreciate that other procedural languages may be suitable. In other embodiments, the programming language can be an object oriented programming language such as C++, and so on. For discussion purposes, we can assume without loss of generality that the source code is a C language program code. FIG. 4 shows an example of an SQL query and the resulting C source code that can be generated from the SQL query.

Figure 5A:
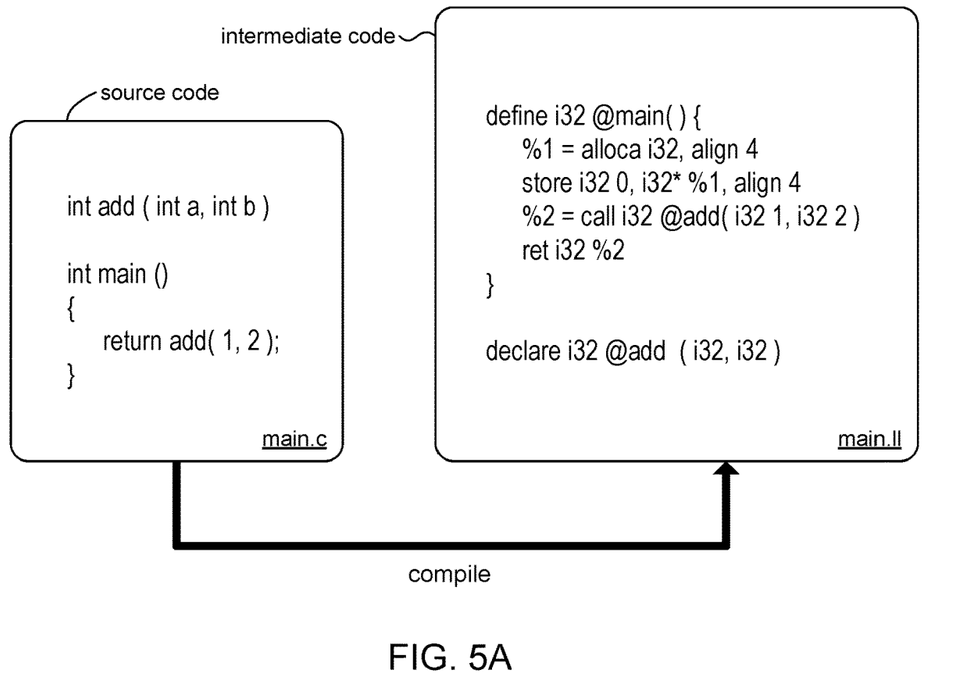
FIGS. 5A and 5B illustrate examples of source code expressed in an intermediate representation.
Figure 5B:
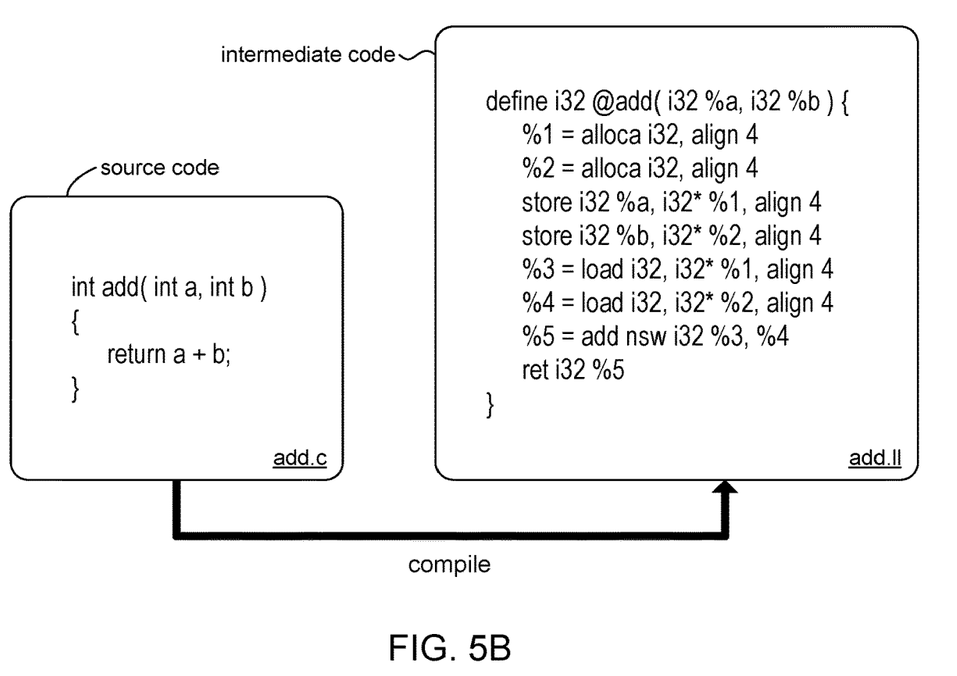

At operation 306, the query engine 102 can compile the source code 116a to generate second program code (e.g., intermediate code 118a), for example, using compiler 118. Any suitable compiler 118 can be used. In some embodiments, for example, where the source code 116a is a C program, the compile 118 is a suitable C compiler. In a particular implementation, the compiler 118 is the LLVM C compiler, originally developed at the University of Illinois at Urbana-Champaign and released under the University of Illinois/NCSA Open Source License. The LLVM compiler can generate intermediate code 118a from the C language source code 116a that comprises statements expressed in an intermediate representation referred to as the LLVM intermediate representation. It is understood by persons of ordinary skill that the intermediate code 118a does not constitute machine executable code. The intermediate code 118a is a machine (processor architecture) independent representation of the source code 116a; it cannot be directly executed by a CPU, but rather must first be translated into machine executable (binary) code. FIGS. 5A and 5B show some simple examples of C code programs (the ".c" modules) and their corresponding intermediate code (the ".||" modules). As FIGS. 5A and 5B illustrate, in some embodiments, the intermediate representation can be human readable text.

Figure 6:
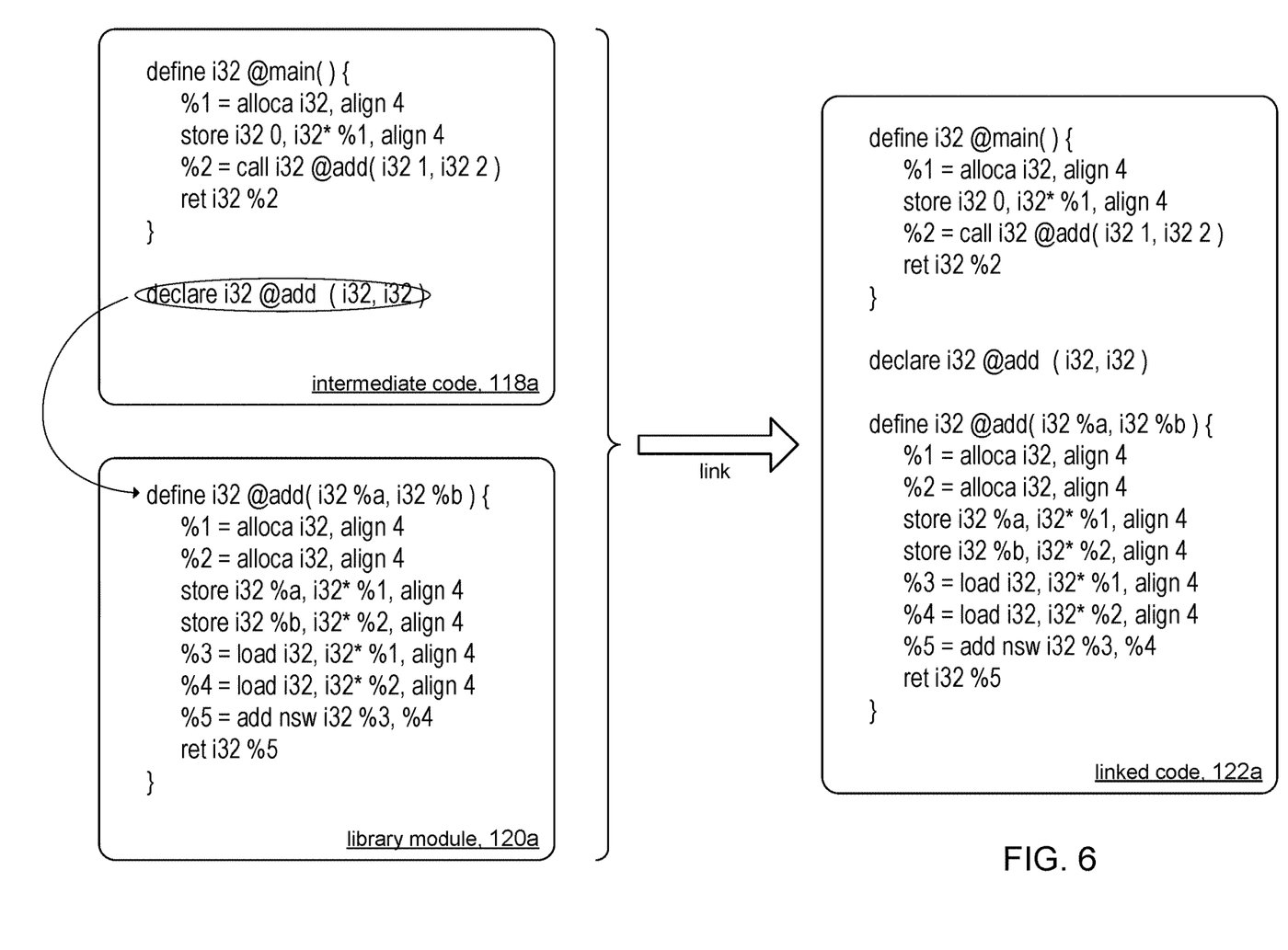
FIG. 6 illustrates an example of linking intermediate code.

At operation 308, the query engine 102 can link the intermediate code 118a to generate third program code (e.g., linked code 122a), for example, using linker 122. In some embodiments, for example, the LLVM compiler can perform the linking operation. As explained above, the linker 122 can resolve function calls that are made in the source code 116a (and in the corresponding intermediate code 118a), but are not defined in the source code 116a. The linker 118 can link the function calls in the intermediate code 118a to the actual functions in one or more library modules 120a in the library 120. In accordance with the present disclosure, for example, the generated source code 116a may contain calls (invocations) to functions to perform operations on various data structures defined in the database 104. The code that implement those functions can reside in the library modules 120a, rather than being defined in the source code 116a. Accordingly, the intermediate code 118a that is generated from the source code 116a will contain statements that invoke such functions, but otherwise does not contain statements that define such functions. The linker 118 can copy functions from the library modules 120a and combine them with the intermediated code 118a to produce the linked code 122a. In some embodiments, functions in the library modules 120a are also expressed using the same intermediate representation that is used in the intermediate code 118a, so that the resulting linked code 122a can be expressed in a single language. FIG. 6 shows an example of linking, where in some embodiments, the linked code 122a comprises a copy of the intermediate code 118a and a copy of those functions contained in the library 120 (library functions) that are invoked in the intermediate code 118a. Although the example in FIG. 6 shows only one function in the library module 120a, a library module in general may contain more than one function.

Figure 7:
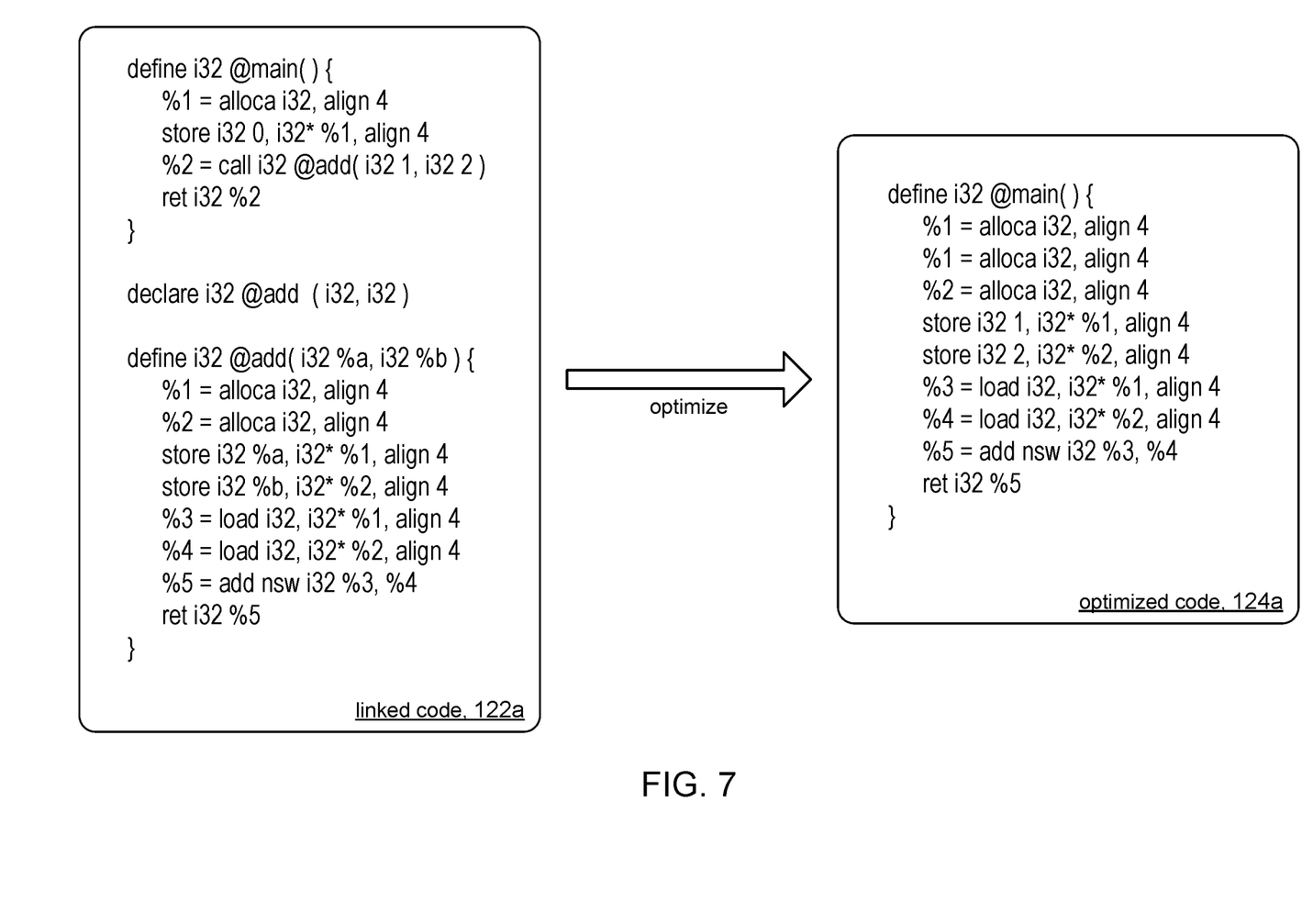
FIG. 7 illustrates an example of optimizing linked code.

At operation 310, the query engine 102 can optimize the linked code 122a (intermediate code 118a plus code comprising one or more library functions) to produce fourth program code (e.g., optimized code 124a) that improves the speed of execution in producing query results. In some embodiments, the LLVM compiler can used to perform the optimization. In some embodiments, for example, optimization can include inlining the code corresponding to function calls made in the intermediate code 118a. In some embodiments, for example, code comprising the library functions that correspond to function calls made in the intermediate code 118a can be inlined in the intermediate code 118a. Inlining can include replacing statements in the intermediate code 118a relating to the function call with statements comprising the called function. In various embodiments, all or some of the library functions can be inlined and all or some functions originally defined in the source code 116a can be inlined. Inlining called functions can improve processing speed by avoiding context switching (e.g., saving and reloading the program counter, registers, and so on) when making a function call, which requires a certain amount of time and thus impacts the response time of the database query. Moreover, library functions may occur toward the end of the linked code 122a. Inlining the library functions can avoid the overhead (time penalty) of potential cache misses due to having to jump to memory locations that are "far away" from their position of invocation in the intermediate code 118a. FIG. 7 illustrates an example of optimized code 124a produced from the linked code example of FIG. 6.

Figure 8:
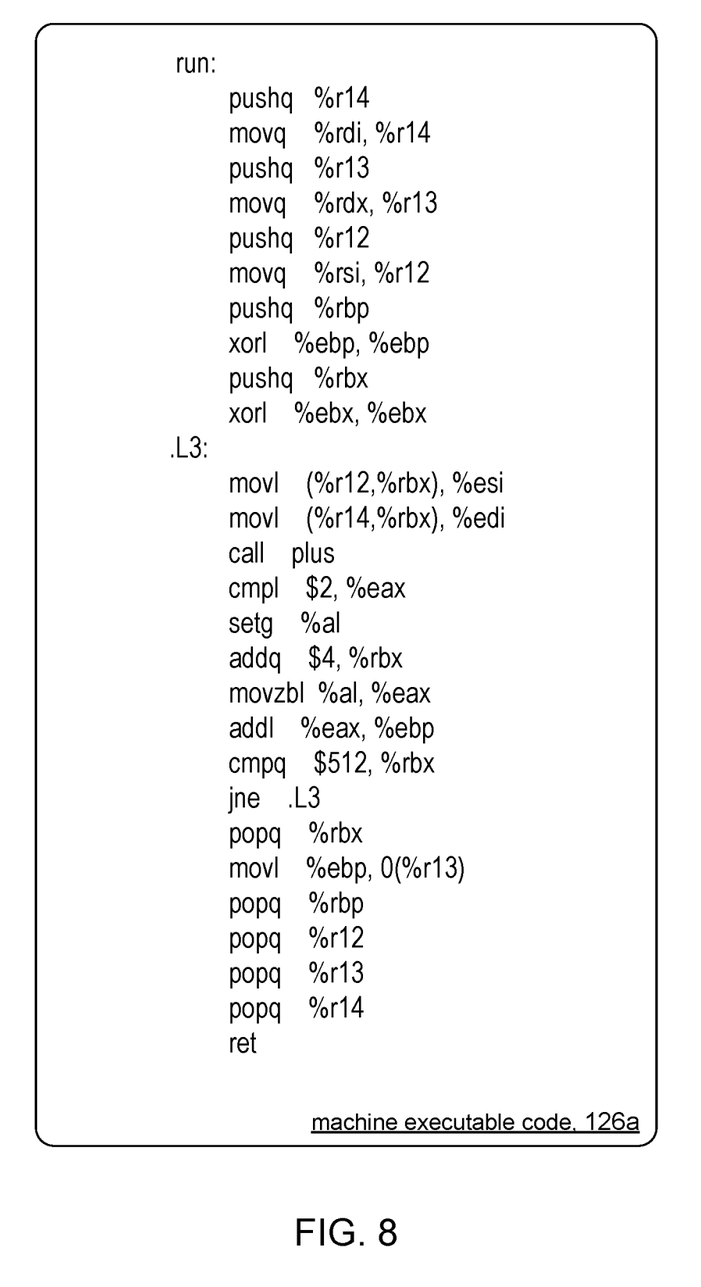
FIG. 8 illustrates an example of machine executable code, as expressed in an assembly language.

At operation 312, the query engine 102 can generate machine executable code (e.g., 126a) from the optimized code 124a; e.g., using the assembly code generator 126. In some embodiments, the LLVM compiler can generate the machine executable code. The machine executable code 126a is binary code comprising a series of 1's and 0's that can be directly executed by the CPU targeted by the binary code 126a. FIG. 8 shows an example of binary code 126a expressed in human-readable assembly language. The example represents binary code that corresponds to the source code shown in FIG. 4.

At operation 314, the query engine 102 can provide or otherwise load the machine executable code 126a into the target processor (e.g., processor 106). The machine executable code 126a, when executed by the processor 106, will cause the processor 106 to perform operations (optimized) to access the database 104 and produce query results in accordance with the received database query. The query results can then be provided to the user, for example, via interface 112.

Figure 9:
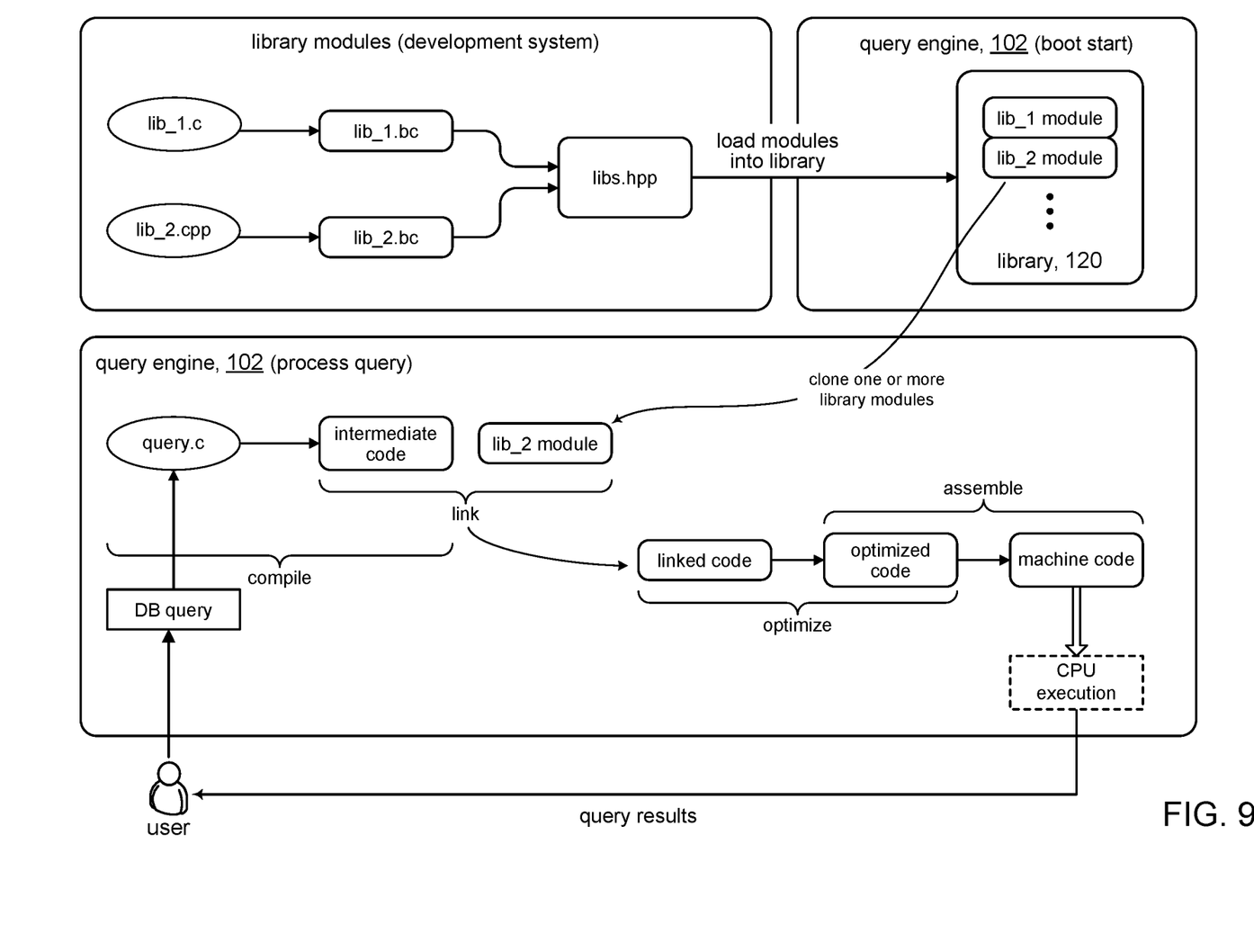
FIG. 9 illustrates the development of library modules.

FIG. 9 shows that in accordance with the present disclosure, the library 120 can be developed and downloaded to the query engine 102 independently of the processing of database queries in the query engine 102. In some embodiments, the library modules (e.g., lib_1, lib_2) contained in library 120 can be developed in a development system separate from the query engine 102. As FIG. 9 shows, the library modules can be written in any suitable language; e.g., the figure shows lib_1 is written in C and lib_2 is written in C++.

Each library module can contain one or more functions. The functions in a library module can be related, although this is not necessary. In some embodiments, the functions can support complex data structures used in the database 104. For example, lib_1 may comprise functions relating to the management of a hash table, functions in lib_2 may comprise functions relating to the management of an index table, and so on. The source code (e.g., query.c) that is generated for a given database query might invoke one or more such functions in order to perform the operations needed to produce a query result.

The library modules can be compiled into a common intermediate representation (e.g., also referred to as "byte code"), shown in FIG. 9 as ".bc" files. For example, the C and C++ code can be compiled using the LLVM compiler to produce intermediate code for lib_1 and lib_2 that uses the same intermediate representation. The library modules can then be loaded into the query engine 102, for example, a boot up time. These library modules can be referred to as pre-compiled modules.

The processing of a query shown in FIG. 9 is explained in FIG. 3. The user can enter a database query. Processing of the database query includes generating source code from the received query (e.g., query.c). The source code can be compiled to produce intermediate code. During the linking phase, one or more library modules can be clone or copied from the library 120, depending on which functions were call in query.c and where those functions are among the library modules. FIG. 9 shows that the linking process only needed the lib_2 library module. The resulting linked code can be optimized to produce optimized code. The optimized code can then be assembled to produce machine executable code. The query engine 102 then loads the machine executable code for execution by a CPU to cause the CPU to perform operations that produce query results in accordance with the database query.

CONCLUSION

Embodiments in accordance with the present disclosure allow for development of functions to access complex data structures in the database 104. More particularly, as can be seen in FIG. 9, these data structure functions can be written, tested, and debugged independently of activity in the query engine 102. The data structure functions can be pre-compiled and incorporated into one or more library modules, which can then be loaded into a runtime library 120 and accessed by the query engine 102 during execution of a database query. By contrast, if such data structure functionality is coded directly into the generated source code (e.g., query.c) instead of in a library module, it would be more difficult to unit test and verify the code for such data structures since the code is only available a runtime and thus not accessible for standard testing frameworks such as Google Test (gtest) and the like.

Furthermore, if the data structure functionality is directly coded into the generated source code, the time to compile the resulting source code can be significant, and can defeat the purpose of generating source code to speed up execution of database queries. On the other hand, embodiments in accordance with the present disclosure provide the data structure functions as already-compiled library modules that need only to be linked to, resulting in faster compile times which significantly improves the functioning of the computer during query processing.

Embodiments in accordance with the present disclosure provide pre-compiled library modules that are expressed in the same intermediated representation as the intermediate code 118a. The use of an intermediate representation instead of machine executable code allows for various optimizations to the linked code 122a to further reduce execution time to produce a query result.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
receiving a database query expressed in a database query language; and
executing the database query to produce a query result, including:
generating source code from the database query comprising statements expressed in a programming language that is not a machine level programming language;
generating first intermediate code from the source code comprising statements expressed in an intermediate representation that is not a machine level programming language;
linking function calls made in the first intermediate code to one or more functions stored in a library of functions to produce second intermediate code, each of the one or more functions comprising statements expressed in the intermediate representation, wherein the one or more functions are previously compiled from source code prior to receiving the database query, wherein the linking includes copying the one or more functions from the library of functions into the first intermediate code to produce the second intermediate code;
transforming the second intermediate code to produce transformed intermediate code, said transforming including replacing at least one function call with statements that comprise a function called by the at least one function call to perform the one or more functions without invoking the one or more functions from the library of functions, wherein the programming language is a procedural source code to produce the first intermediate code; and
generating machine executable code from the transformed intermediate code and executing the machine executable code to produce the query result.

2. The method of claim 1, further comprising receiving the one or more functions and storing them in the library of functions, wherein the receiving and storing of the one or more functions occur separately and independently of receiving the database query and processing the database query.

3. The method of claim 1, wherein the intermediate representation is independent of processor architecture, wherein the machine executable code is specific to a processor architecture.

4. The method of claim 1, further comprising generating an execution plan for the database query and generating the source code based on the execution plan.

5. A non-transitory computer-readable storage medium having stored thereon computer executable instructions, which when executed by a computer device, cause the computer device to:
- receive a database query expressed in a database query language; and
- execute the database query to produce a query result, including:
  - generating source code from the database query comprising statements expressed in a programming language that is not a machine level programming language;
  - generating first intermediate code from the source code comprising statements expressed in an intermediate representation that is not a machine level programming language;
  - linking function calls made in the first intermediate code to one or more functions stored in a library of functions to produce second intermediate code, each of the one or more functions comprising statements expressed in the intermediate representation, wherein the one or more functions are previously compiled from source code prior to receiving the database query, wherein the linking includes copying the one or more functions from the library of functions into the first intermediate code to produce the second intermediate code;
  - transforming the second intermediate code to produce transformed intermediate code, said transforming including replacing at least one function call with statements that comprise a function called by the at least one function call to perform the one or more functions without invoking the one or more functions from the library of functions, wherein the programming language is a procedural language, wherein generating the first intermediate code includes compiling the source code to produce the first intermediate code; and
  - generating machine executable code from the transformed intermediate code and executing the machine executable code to produce the query result.

6. The non-transitory computer-readable storage medium of claim 5, wherein the intermediate representation is independent of processor architecture, wherein the machine executable code is specific to a processor architecture.

7. An apparatus comprising:
one or more computer processors; and
a computer-readable storage medium comprising instructions for controlling the one or more computer processors to be operable to:
- receive a database query expressed in a database query language; and
- execute the database query to produce a query result, including:
  - generating source code from the database query comprising statements expressed in a programming language that is not a machine level programming language;
  - generating first intermediate code from the source code comprising statements expressed in an intermediate representation that is not a machine level programming language;
  - linking function calls made in the first intermediate code to one or more functions stored in a library of functions to produce second intermediate code, each of the one or more functions comprising statements expressed in the intermediate representation, wherein the one or more functions are previously compiled from source code prior to receiving the database query, wherein the linking includes copying the one or more functions from the library of functions into the first intermediate code to produce the second intermediate code;
  - transforming the second intermediate code to produce transformed intermediate code, said transforming including replacing at least one function call with statements that comprise a function called by the at least one function call to perform the one or more functions without invoking the one or more functions from the library of functions, wherein the programming language is a procedural language, wherein generating the first intermediate code includes compiling the source code to produce the first intermediate code; and
  - generating machine executable code from the transformed intermediate code and executing the machine executable code to produce the query result.

8. The apparatus of claim 7, wherein the intermediate representation is independent of processor architecture, wherein the machine executable code is specific to a processor architecture.

* * * * *